Patented Sept. 12, 1933

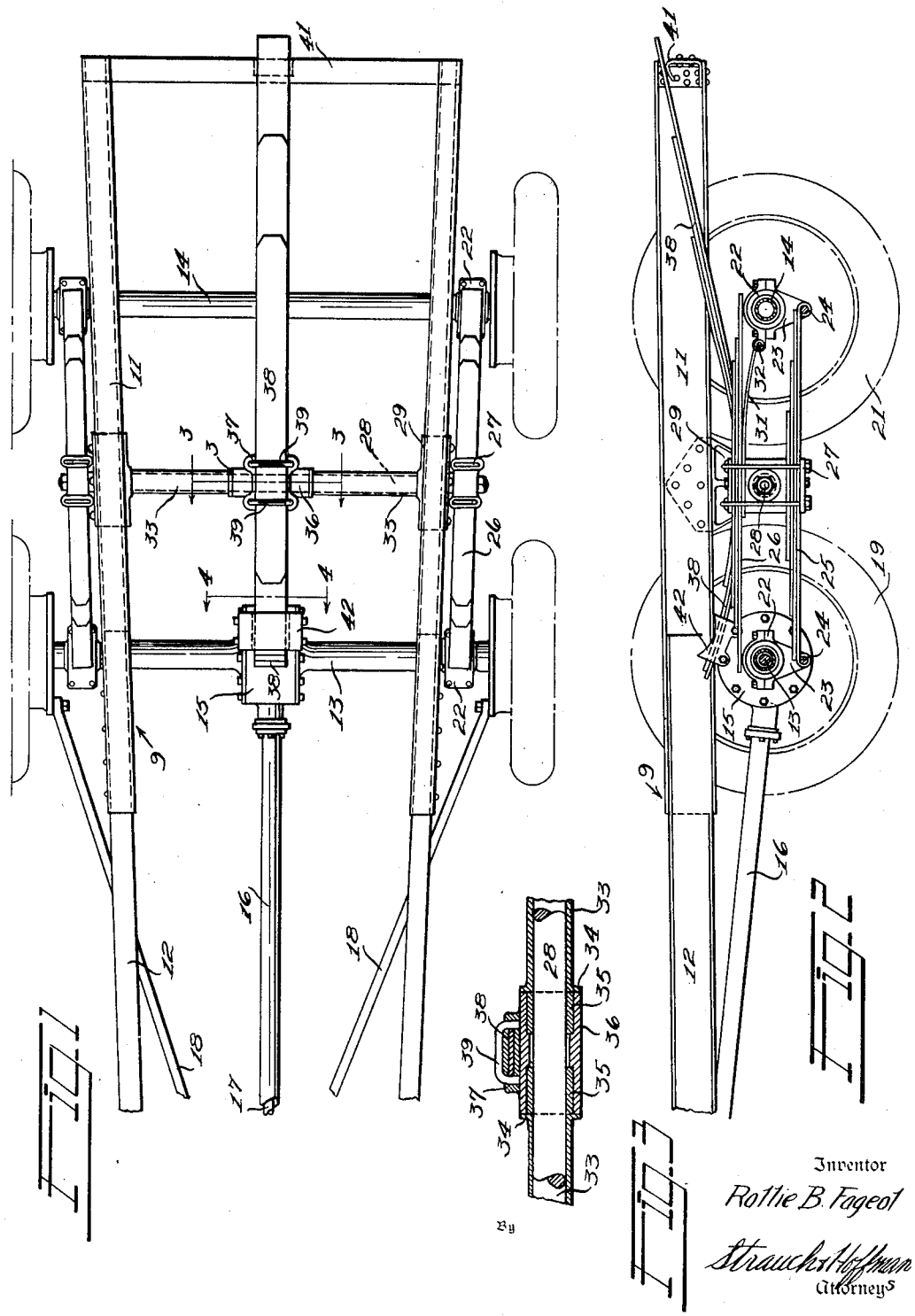

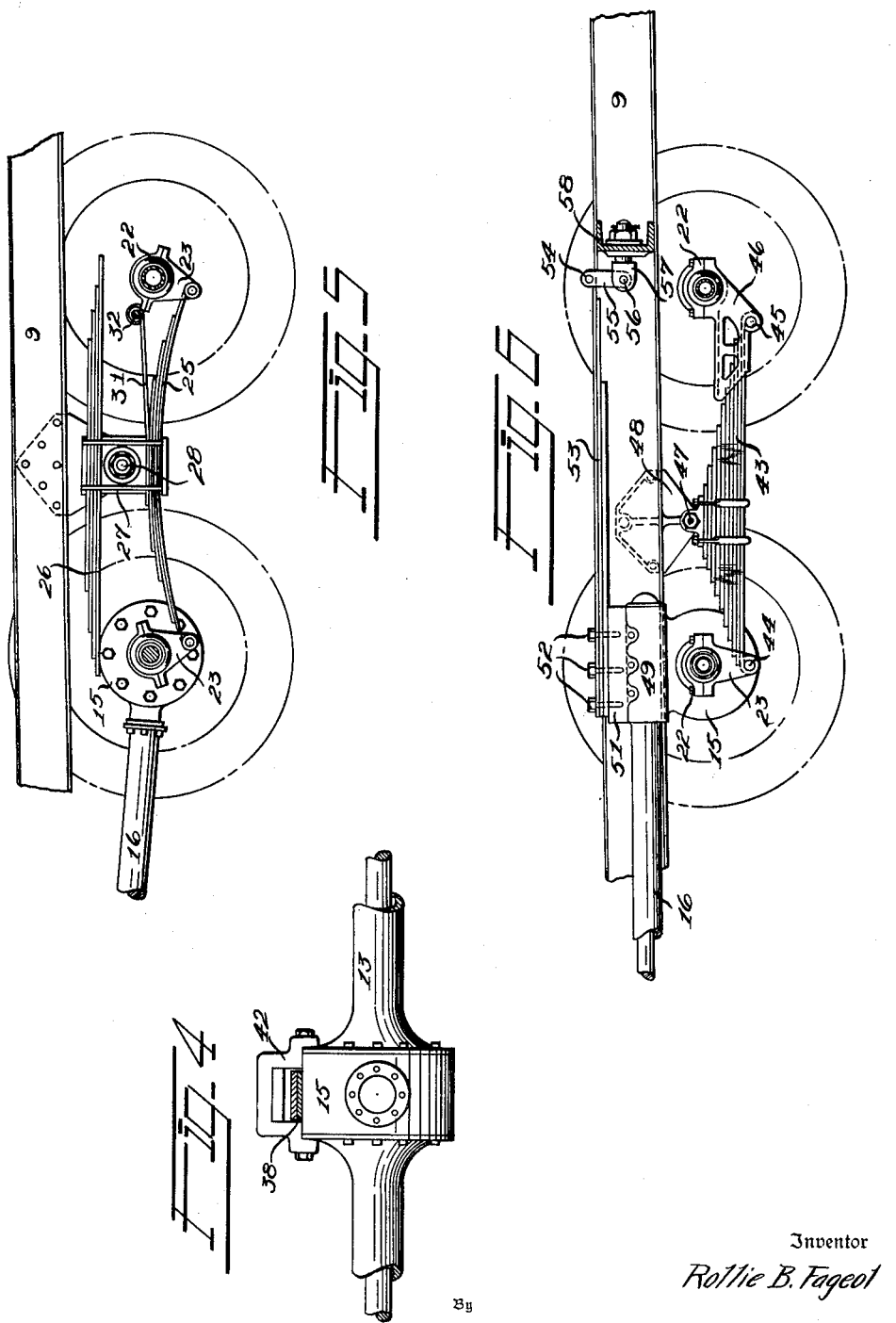

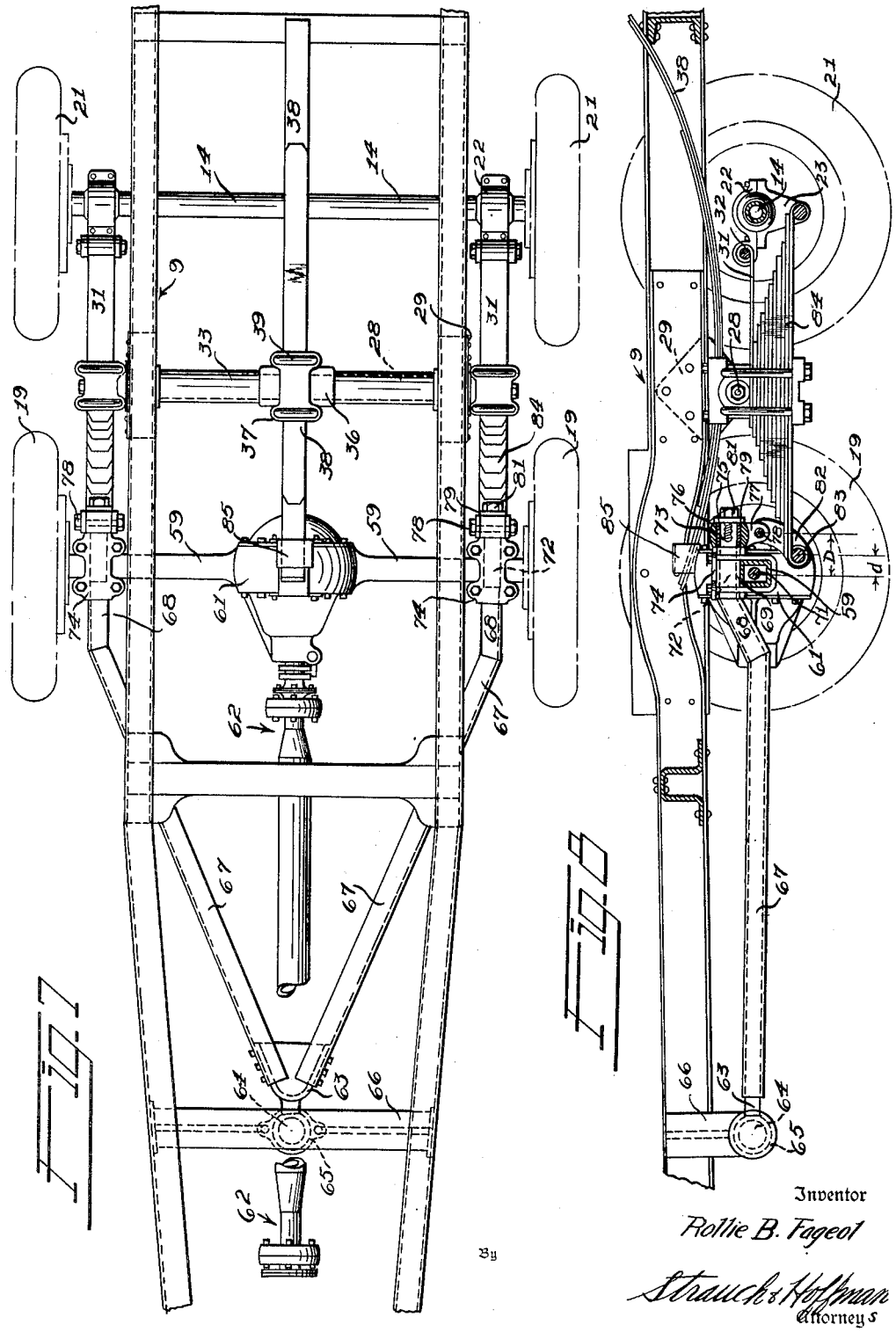

1,926,274

UNITED STATES PATENT OFFICE 1,926,274

MULTIWHEEL VEHICLE OF THE TANDEM AXLE TYPE

Rollie B. Fageol, Los Angeles, Calif., assignor, by mesne assignments, to Automotive Engineering Corporation, a corporation of Delaware Application April 26, 1930. Serial No. 447,542

11 Claims. (Cl. 180—22)

This invention relates to suspension arrangements for multiwheel vehicles. The invention is particularly concerned with tandem axle combinations wherein one of the axles is dead and the other is a drive axle.

When multiwheel vehicles, of the type having a single drive axle, are driven in substantially unloaded condition over uneven wet roads, or over soft or slippery ground, it often becomes difficult or impossible to secure sufficient traction for the driven wheels to move the vehicle. It is a major object of the present invention to remedy this situation by providing means associated with the chassis frame for automatically regulating the traction by maintaining the driven wheels in effective engagement with the ground under substantially all operating conditions.

Suspension systems for tandem axles must be of a requisite flexibility. Quite often, in securing the necessary flexibility and simplicity of design, the suspensions permit a certain amount of drag on the tires at times, due to shifting of an axle laterally relative to the frame to place the tandem wheels slightly out of alignment. This drag may be substantially eliminated by utilizing very heavy springs with somewhat rigid axle connections, but the gain is more than offset by the resulting undesirable riding qualities of the vehicle when unloaded, and the resulting loss of flexibility. I prefer to utilize relatively light springs to support the vehicle in its unloaded condition in order that it may be driven for great distances at high speeds (when unloaded or lightly loaded) with comfort and without subjecting it to destructive shocks and stresses. In order to carry out this preferential design, I add a second set of springs which come into action under predetermined load conditions, and I provide means for neutralizing the drag that might otherwise result from the use of the light primary springs. A single device may be effectively utilized to function dually as a drag neutralizer and a traction regulator.

From the foregoing discussion it will be seen that great importance has been attached to the operation and riding characteristics of a multiwheel road vehicle at such time that the latter is unloaded or only lightly loaded; and rightly so, since it is not infrequent in actual practice that modern vehicles (especially light trucks) are driven empty or but lightly loaded during more than fifty per cent of their full operating time. Accordingly, some of the major objects of my invention are as follows:

It is an object of this invention to provide a multiwheel spring suspension embodying relatively light springs in combination with an additional set of springs which assists said light springs only to support relatively heavy loads or to resist relatively great road shocks.

Another object lies in the provision of means directly associated with a drive axle for increasing the traction of the driven wheels under certain conditions of operation of the vehicle. In this connection, it is a more specific object to associate a traction spring with the frame and the driven axle in such manner that said spring resists upward movement of said axle, and may bear down upon said driven axle with a force increasing in proportion to increase in distance between the frame and the axle.

A further object of the present invention is to provide mechanism for neutralizing drag by preventing the axles from shifting in the direction of their longitudinal axes.

Still another object is that of providing a multiwheel suspension with a traction regulating device that may function also as a torque neutralizer.

It is also an object of this invention to devise a multiwheel vehicle having desirable operating characteristics under light load as well as when fully loaded. More specifically it is an object to provide, in a tandem axle combination, a main and an auxiliary suspension, and means for neutralizing drag and automatically regulating traction.

A further object resides in the utilization, in a trailing axle attachment unit for a standard four-wheel chassis of a spring suspension consisting of the standard springs of the four-wheel vehicle unchanged in form but so connected to the drive axle as to distribute more of the load thereon than on the trailing axle.

Other objects of my invention will appear from the following detailed description when studied in connection with the accompanying drawings, in which:

Figure 1 is a plan view of the rear end of a multiwheeler, showing a preferred form of my invention incorporated therein.

Figure 2 is a vertical longitudinal sectional view of the construction disclosed in Figure 1, the section being taken immediately inward of the adjacent wheels and with the adjacent side member of the frame removed.

Figure 3 is a detailed sectional view taken substantially on the plane indicated by line 3—3 in Figure 1.

Figure 4 is a partial section taken on line 4—4,

Figure 1, to show the manner in which the traction spring is saddled upon the rear axle.

Figure 5 is a view corresponding to Figure 2, showing the position of the suspension with the vehicle unloaded. The traction spring has been removed for the sake of clarity, and this view constitutes a modification to the extent that the auxiliary spring (between the trunnion mounting and the trailing axle) is disposed in a different manner.

Figure 6 discloses, in a view similar to that of Figure 2, a modified form of the invention in which a traction regulating spring is connected directly between the frame and the driven axle.

Figure 7, showing a further modification, is a plan view of a portion of a multiwheeler wherein standard springs are employed to interconnect the tandem axles to effect an unequal load distribution upon said axles.

Figure 8 is a vertical longitudinal sectional view of the apparatus of Figure 7, the section being taken just inside the adjacent wheels and with the adjacent side member of the frame removed.

With further reference to the drawings, in which like numerals are employed to designate like parts, and with particular reference to Figures 1—4;

The vehicle in Figures 1—4 may be constructed de novo as a multiwheeler but, as illustrated, it is built up from a standard Ford chassis. It comprises a frame 9 formed by adding an extension 11 to the standard Ford frame 12, a drive axle 13 (which may be the standard drive axle) beneath the end of the standard frame 12, a trailing dead axle 14 beneath the extension 11, and a special suspension system for supporting the frame upon said axles. The drive axle 13 includes a differential housing 15 to which is rigidly secured a torque tube 16 that houses the propeller shaft 17. Radius rods 18 are connected to the axle 13 and converge forwardly to be connected, together with the forward end of the torque tube, to the frame by a conventional ball joint (not shown). In this manner the drive axle is universally connected to the frame for defined swinging and tilting movements and has its torque reactions neutralized. Driven wheels 19 and idle wheels 21 support the ends of the drive and trailing axles respectively. The special suspension system is constructed and arranged as follows:

Each end of each axle carries a ball hanger 22 of the general type disclosed in my Patent #1,660,188 of February 21, 1928, which hangers permit the axles to tilt and rotate relative thereto during operation. When brakes are applied to the trailing axle, the braking torque may be resisted in any conventional manner, as by pinning one of the ball hangers to the axle to prevent relative rotation therebetween. Each ball hanger has a depending lug 23 which pivotally receives, as at 24, one end of a relatively light leaf spring 25. There are two such springs, one at each side of the frame, for interconnecting the corresponding ends of the axles. Directly above each spring 25 there is disposed an overload spring 26 which has its ends projecting over the axle ends in disconnected relation thereto. The intermediate portions of springs 25 and 26 are clamped together by a U-bolt and saddle assembly 27 and pivoted upon a transverse trunnion shaft 28 that is supported from the frame by brackets 29. A short spring arm 31 has one end pivotally connected, as at 32, to the rearmost ball hanger and has its opposite flat end clamped against the lower surface of spring 26 by the clamping assembly 27. This arm cooperates with spring 25 to resist torque reactions and to prevent the idle axle from shifting laterally of the vehicle frame to set up drag on the tires.

In operation of the apparatus thus far described the springs 25 are convexly bowed and the springs 26 are spaced from the axles when the vehicle is unloaded or only lightly loaded (see Figure 5, later to be described). As the load is increased or the wheels subjected to violent road shocks the frame and axles approach each other to straighten springs 25 and bring the ends of springs 26 into load-supporting contact with the tops of the ball hangers on the axle ends (as illustrated in Figure 2). Hence, when the vehicle is carrying relatively light loads the springs 25 do all of the supporting and impart desirable riding qualities to the vehicle, and when the load is increased to a predetermined value the springs 26 come into play to assist the springs 25 in supporting the heavier loads.

A pair of spacing sleeves 33 (see especially Figure 3) is mounted on the trunnion shaft, the outer ends of the sleeves abutting their respective brackets and their inner ends being flanged as at 34 at points spaced from the center of the shaft. The space between the flanges 34 is occupied by a pair of bronze bushings 35 and the sleeve portion 36 of a saddle 37 that is rotatably borne by said bushings. The saddle 37 provides a pivotal fulcrum for the intermediate portion of a light and relatively long traction spring 38, the latter being clamped to the saddle by a pair of U-clips 39. This spring extends rearwardly to have one end freely supported on the rear cross-frame member 41, and forwardly to have its other end react against the upper surface of the differential housing 15 (or the worm housing, as the case may be). A stirrup casting 42 (see also Figure 4) is rigidly secured upon the differential housing to receive and guide the forward end of the spring during oscillation of the drive axle and flexure of the spring. The stirrup prevents the spring and axle from moving transversely relative to each other and since the saddled portion of the spring is prevented from moving transversely along the axis of the trunnion shaft, the spring serves as a drag neutralizer for the driven axle by resisting lateral movement thereof with respect to the frame. The stirrup is slightly deeper than the spring thickness in order to permit unhampered tilting and swinging of the axles.

In its natural or free position (unassembled) the traction spring is substantially straight or slightly curved. In the full load position illustrated in Figure 2 the spring preferably is slightly flexed with a tendency to straighten out, thus exerting a downward force on the driven axle. As the load decreases the suspension springs 25 go into increasing degrees of convexity, thus causing the frame and axles to separate from each other. This rising movement of the frame is never sufficient, however, to permit the traction spring to assume its free position and hence the forward end of the traction spring is forced downwardly against the drive axle to increase the traction of the wheels thereof. It will be seen, therefore, that when the vehicle is unloaded its driving wheels nevertheless obtain sufficient traction by carrying more of the chassis weight than do the idle wheels.

Figure 5 serves two functions. As hitherto stated, it shows the position that the spring suspension of Figure 2 assumes when the vehicle is unloaded. It further discloses a modified manner of connecting the auxiliary leaf spring 31 to the trunnion mounting. The forward end of the flat spring 31 is here clamped into position on the upper surface of the spring 25 instead of against the lower surface of spring 26. Spring 31 serves as a stabilizer, a drag neutralizer (and may serve as a torque rod when the ball hanger 22 is pinned to the axle) for the rear trailing axle. A traction regulating and drag neutralizing spring, as in Figure 2, may be added in Figure 5 if desired.

In Figure 6 there is shown a modified form of spring suspension and a modified type of traction regulating means. The suspension, which per se forms no part of the present invention, comprises at each side of the frame a single spring beam 43 having its forward end pivoted as at 44 on a hanger lug 23, its rear end pivoted as at 45 and slidably received within a specially shaped hanger lug and bracket 46, and its intermediate portion pivoted upon a transverse trunnion 47 carried by a bracket 48. This suspension is so designed that the trunnion is closer to the drive axle than to the trailing axle, whereby the former supports the greater portion of the load that is divided between the two. A torque tube 16 is united with a worm housing 49 carried by the differential housing 15.

A flat-topped bar 51 is rigidly secured upon the upper surface of the worm housing 49, and upon the flat top of this bar there is firmly attached, as by stud bolts 52, the heavy end of a cantilever leaf spring 53. The leaves of this spring are of various lengths and project rearwardly with the rear end of the longest one connected, as at 54, to one end of a shackle 55. The opposite shackle end is pivotally pinned at 56 to an eye bolt 57 that swivels on a horizontal axis through a cross frame member 58. This shackled and swiveled connection to the frame permits the driven axle to swing and tilt without binding and, when properly designed, may cooperate with the spring to serve as a drag neutralizer.

The spring 53 preferably has in its normal, undeflected position, an appreciable concave curvature so that when the frame is supported on the shackled end thereof to straighten the spring somewhat (to reduce the camber) there is a resulting downward component upon the driven axle to resist rising movement of the latter. This is so because of the rigid interconnection of the spring and axle and the forward conventional connection (not shown) of the torque tube 16 with the frame. Thus the spring 53 always tends to secure proper traction for the driven wheels by resisting upward oscillation of the driven axle to cause said driven wheels to hug the road surface. In the illustrated position the vehicle is under full load, or substantially so.

In Figures 7 and 8 there is disclosed a further modification of the present invention, showing the method and apparatus for converting a four-wheel vehicle of the Hotchkiss drive (such as the Willys truck) into a multiwheeler having a trailing tandem axle. The frame 9 is a built up structure similar to that of Figures 1 and 2. A standard Hotchkiss drive axle 59 and an added trailing axle 14 are arranged in tandem beneath the rear extended portion of the frame. The drive axle includes a differential 61 into which projects a flexible Hotchkiss driving assembly indicated generally by the numeral 62 (not shown in Figure 8, for convenience and clarity of illustration). In order to hold the drive axle in proper position, to take the torque reactions thereof and to provide a support for the spring suspension, the following apparatus is added:

An arm 63, having a ball end 64 universally carried in a spherical socket 65 on a special forwardly disposed cross frame member 66, is rigidly secured between the converging ends of a pair of channel beams 67. The diverging ends of the beams 67 carry, adjacent the ends of the drive axle, a pair of channeled arms 68 which are recessed on their lower surfaces, as at 69, to receive the rectangular portions of the axle housing that surround the live shaft 71. A short solid rod 72 is projected into the rear end of each channeled arm 68, and a U-bolt assembly 74 clamps this rod, the rectangular axle ends and the arms 68 in locked position with respect to one another. The rear end of rod 72 carries an integral cylindrical extension 73 having mounted thereon a bearing and spacing sleeve 75. The latter is journaled in a substantially cylindrical hanger 76 which has a bifurcated depending portion 77 that carries a pivot bolt 78. A washer 79, larger in diameter than the sleeve 75, is drawn against said sleeve and the extension 73 by a stud bolt 81. The hanger 76 thus is free to oscillate upon the surface of the bearing sleeve 75.

The bolt 78 pivotally receives the upper end of a curved shackle 82, the lower end of which pivotally supports, as at 83, one end of a standard spring beam 84. This beam 84 is centrally trunnioned upon the frame and connected to the trailing axle in substantially the same manner as was spring 25 in Figure 5. The elements 73—83 inc., constitute, in effect, a universal connection between the spring beam and the drive axle to permit freedom of swinging and tilting of the latter. These elements, moreover, so cooperate with the other mechanism that the standard spring 84 may be taken from the four wheel truck and pivoted at its center and yet be adapted to provide a greater distance between the forward axle and the trunnion than between the trailing axle and the trunnion. The difference in these distances is indicated at "$d$", Figure 8. In spite of this difference "$d$", a greater portion of the load is carried upon the drive axle than on the trailing axle, this resulting from the fact that the load supported upon the sleeve 75 reacts at a distance "$D$" to the rear of the driven axle upon the end of a rigid lever (elements 63, 67, 68, 72, 73) that is pivotally fulcrumed on the frame at 64, 65 and reacting between its ends upon the axle housing. It will be observed that the magnitude of "$D$" determines the proportional distribution of the load upon the tandem axles.

A traction regulating mechanism substantially identical to that of Figures 1—4 is employed in Figures 7 and 8, the only difference being that the stirrup casting 42 has been redesigned to form a casting 85 adapted to be secured upon the differential housing 61 of the Hotchkiss drive axle 59.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a multiwheel road vehicle, a frame; a pair of tandem axles, at least one of which is a drive axle, arranged beneath said frame; a suspension system resiliently supporting said frame upon said axles; and an automatic traction regulating mechanism connected at two points with the frame and including a spring mounted at one end on said frame and directly connected, at its other end, to said drive axle; said traction regulating spring being designed and arranged to resist upward movement of said drive axle.

2. In the road vehicle defined in claim 1, means carried by said frame intermediate the ends of said traction regulating spring to provide a fulcrum for the latter, whereby said traction spring acts as a resilient lever when the frame and axles move vertically relative to one another.

3. In the combination set forth in claim 1, means for preventing lateral movement of said traction regulating spring relative to the frame, whereby said last mentioned means serves as a drag neutralizer for said drive axle.

4. In a multiwheel road vehicle, a frame; a pair of tandem axles disposed beneath one end of said frame; a suspension system supporting said frame upon said tandem axles in a manner permitting the axles to swing during operation and to approach the frame upon increase in carried load; and traction regulating mechanism connected between said frame and one of said axles; said mechanism including a leaf spring directly connected to said one axle and designed to vary the load distribution ratio upon said tandem axles automatically in response to relative vertical movement between said frame and said axles.

5. In the combination specified in claim 4, said leaf spring being arranged longitudinally of the vehicle; and said mechanism including a transverse member providing a pivotal fulcrum for an intermediate portion of said spring, whereby the spring acts as a deformable lever when said frame and said one of said axles move toward and from each other.

6. In a multi-wheel road vehicle, a chassis frame; a pair of tandem axles disposed beneath one end of said frame; a suspension at each side of said frame; each suspension comprising a relatively light spring flexibly interconnecting said axles and pivotally mounted on said frame, and an overload spring swingingly mounted with its ends projecting over the axles, said springs being so designed that relatively light loads are supported substantially wholly by said light spring and that the ends of said overload spring react against said axles to support a portion of the load upon material deflection of said light spring; means flexibly suspending one end of said light spring from one of said axles; and a resilient stabilizing arm connected to said means and securely connected with the mid-portion of one of said springs.

7. In a road vehicle, a frame; a pair of tandem axles arranged beneath one end of said frame; a suspension at each side of said frame for supporting the latter upon said axles, said suspensions including spring beams pivotally mounted on a transverse axis; a leaf spring longitudinally disposed centrally of the vehicle frame and rockably mounted intermediate its ends on a transverse axis substantially aligned with the first-mentioned axis; one end of said spring being connected to the middle of one of said axles and the other end being supported by said frame.

8. In the combination defined in claim 7, the rockably mounted portion of said leaf spring being held against transverse movement relative to the vehicle frame.

9. In a vehicle construction, a frame; a set of tandem axles comprising a drive axle and an idle axle; disposed at one end of said frame; a suspension system, including relatively light springs flexibly connected to the axles for resiliently supporting said frame upon said axles; a set of overload springs connected to said frame and associated with said axles, said overload springs being designed to support an appreciable portion of the load upon said axles only when said relatively light suspension springs become deflected a substantial predetermined amount; a torque tube assembly for driving said drive axle and stabilizing the latter relative to said light springs; and drag neutralizing means connected between a portion of the frame and said idle axle to stabilize the latter and to resist that movement of said idle axle laterally with respect to the longitudinal axis of the frame, which would otherwise be permitted by said light suspension springs.

10. In a vehicle construction, a frame; a set of tandem axles disposed at one end of said frame; a suspension system, including relatively light springs for resiliently supporting said frame upon said axles; a set of overload springs connected to said frame and associated with said axles, said overload springs being designed to support an appreciable portion of the load upon said axles only when said relatively light suspension springs become deflected a substantially predetermined amount; and drag neutralizing means connected between a portion of the frame and the center of one of said axles to prevent endwise movement of said one axle laterally with respect to the longitudinal axis of the frame.

11. In a multi-wheel road vehicle, a frame; a set of tandem axles, at least one of which is a drive axle, arranged beneath said frame; a suspension system resiliently supporting said frame upon said axles; and a combined traction regulating and drag neutralizing spring arranged centrally of the vehicle and extending from said frame to one of said axles; said spring being designed to ensure sufficient traction for said drive axle as the total load is varied, and to resist lateral movement of said one of said axles.

ROLLIE B. FAGEOL.